No. 885,544. PATENTED APR. 21, 1908.
N. H. SUMMONS.
LOCK NUT.
APPLICATION FILED OCT. 19, 1907.

Witnesses
Hugh H. Ott
F. C. Gibson

Inventor
Nestor H. Summons
By Victor J. Evans
Attorney

UNITED STATES PATENT OFFICE.

NESTOR H. SUMMONS, OF WOODSTOCK, OHIO.

LOCK-NUT.

No. 885,544.      Specification of Letters Patent.      Patented April 21, 1908.

Application filed October 19, 1907. Serial No. 398,225.

*To all whom it may concern:*

Be it known that I, NESTOR H. SUMMONS, a citizen of the United States, residing at Woodstock, in the county of Champaign and State of Ohio, have invented new and useful Improvements in Lock-Nuts, of which the following is a specification.

The invention relates to an improvement in lock nuts for axles, being particularly directed to a simple means in the use of which the nut when in applied position cannot become loosened from that position by any other than manual operation.

The main object of the present invention is the provision of an additional threaded member adapted for free revoluble connection with the nut and arranged for threaded engagement with the axle. The connection of the threaded member with the axle being in reverse direction from the engagement of the nut so that simultaneous and reverse operation of the nut and member are necessary in applying or removing the nut.

The invention will be described in the following specification, reference being had particularly to the accompanying drawings, in which:—

Figure 1:
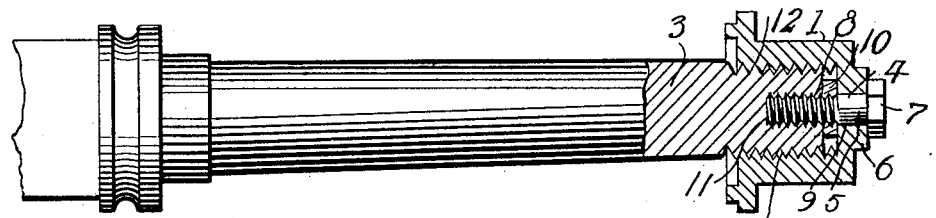
Figure 2:
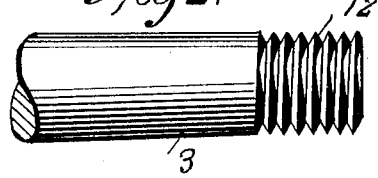
Figure 3:
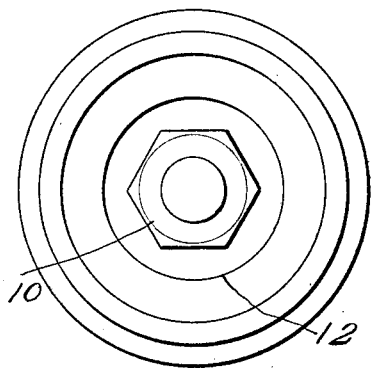
Figure 4:
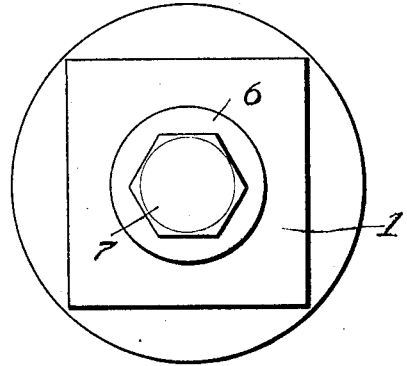

Figure 1 is a view in elevation, partly in section, illustrating the application of my improvement. Fig. 2 is an elevation of the end of the axle. Fig. 3 is a plan of the nut with the improvement therein, the view being taken by looking into the bore of the nut. Fig. 4 is a similar view from the opposite direction.

Referring particularly to the drawings, my improvement is designed for application to a nut 1 interiorly threaded at 2 for engagement in the usual manner with the threaded end of the spindle 3, both the nut and spindle being of any usual or desired type, as they form no material part of the present invention. The locking member 4 of the present invention comprises in effect a bolt having a plane cylindrical portion 5 coextensive in length with the thickness of the forward wall 6 of the nut, the terminal of the bolt adjacent the plane portion having an ordinary head 7, the opposite terminal being threaded, as at 8. The bolt 4 is adapted for loose revoluble engagement with the nut 1, being for this purpose mounted in an opening 9 formed centrally in the wall 6 of the nut, an auxiliary nut 10 engaging the threaded portion 8 of the bolt beyond said wall 6. As thus arranged the bolt is freely revoluble with relation to the nut 1, but is held against otherwise independent movement through engagement of the head 7 and auxiliary nut 10 with the opposing surfaces of the opposing wall of the nut 1. The threaded portion 8 of the bolt, beyond the auxiliary nut, is adapted to engage a threaded bore 11 formed in the end of the spindle 3, the threads in the bore and those on the periphery of the spindle at 12 being reversely arranged.

In use the nut 1 is applied in the usual manner by engagement with the threads 2, the bolt 4 being screwed or seated at the same time in the bore 11 in the spindle. As the threads 2 and those in the bore are reversely arranged it is obvious that in the application of the nut the bolt 4 and nut 1 must be turned in opposite directions, this operation being equally true, of course, in removing the nut. The salient and important feature of the present invention is in mounting the locking member or bolt in the main nut so as to be freely revoluble therein, while at the same time prevented against endwise movement. This feature renders the construction of the reversely threaded portions particularly effective, as it is utterly impossible for endwise movement of the nut 1 without jamming the locking bolt in the threads of the bore, and endwise movement of the locking bolt is equally impossible without binding the main nut on the threads 2. An endwise movement of both the nut 1 and locking bolt necessitates turning of these respective parts in reverse direction, and as such operation cannot occur under any usual or extraordinary jars or movements to which the spindle may be subjected, it is at once obvious that in applied position the nut 1 will remain until the necessary reverse manual operation of the respective parts is performed.

The specific arrangement of parts or their relative sizes is not material to the present invention, the requisite features being solely in adapting the nut and locking member for reverse threaded connection with the spindle and mounting and locking the member in the nut so that it is freely revoluble therein but held against endwise movement.

Having thus described the invention what is claimed as new, is:—

1. The combination with an element and a nut arranged for threaded engagement therewith, of a locking member adapted for threaded engagement with the element and mounted in the nut for free rotation, and means threaded on the member and arranged between the nut and element to prevent endwise movement of the member in one direction.

2. The combination with an element and a nut arranged for threaded engagement therewith, of a locking member arranged for threaded engagement with the element in a direction reverse to that of the nut, and means threaded on the member between the nut and element to prevent independent endwise movement of the member relative to the nut.

3. The combination with an element and a nut arranged for threaded engagement therewith and formed with a central opening, of a locking member adapted for threaded engagement with the element reverse to that of the engagement of the nut, said locking member being freely insertible through the opening in the nut, and an auxiliary nut arranged for threaded engagement with the member and disposed between the end of the element and the nut.

In testimony whereof I affix my signature in presence of two witnesses.

NESTOR H. SUMMONS.

Witnesses:
B. C. VANCE,
O. FAIRCHILD.